(12) United States Patent
Silver et al.

(10) Patent No.: US 11,627,165 B2
(45) Date of Patent: Apr. 11, 2023

(54) MULTI-AGENT REINFORCEMENT LEARNING WITH MATCHMAKING POLICIES

(71) Applicant: DeepMind Technologies Limited, London (GB)

(72) Inventors: David Silver, Hitchin (GB); Oriol Vinyals, London (GB); Maxwell Elliot Jaderberg, London (GB)

(73) Assignee: DeepMind Technologies Limited, London (GB)

( * ) Notice: Subject to any disclaimer, the term of this patent is extended or adjusted under 35 U.S.C. 154(b) by 589 days.

(21) Appl. No.: 16/752,496

(22) Filed: Jan. 24, 2020

(65) Prior Publication Data

US 2020/0244707 A1 Jul. 30, 2020

Related U.S. Application Data

(60) Provisional application No. 62/894,633, filed on Aug. 30, 2019, provisional application No. 62/796,567, filed on Jan. 24, 2019.

(51) Int. Cl.
*G06N 3/08* (2006.01)
*H04L 9/40* (2022.01)
*G06K 9/62* (2022.01)

(52) U.S. Cl.
CPC .......... *H04L 63/205* (2013.01); *G06K 9/6256* (2013.01); *G06N 3/08* (2013.01)

(58) Field of Classification Search
CPC ........ G06N 3/0454; G06N 3/08; G06N 20/00; G06N 3/088; G06N 3/006; G06N 3/0445; G06N 3/0472; G06N 7/005; G06N 3/082; G06N 3/126; G06N 3/04; G06N 5/043; G06N 3/02; G06N 3/0481; G06N 5/00; G06N 5/022; G06N 5/025;
(Continued)

(56) References Cited

U.S. PATENT DOCUMENTS

2019/0102676 A1* 4/2019 Nazari ................. G06N 3/0472
2020/0033868 A1* 1/2020 Palanisamy .......... G05D 1/0221

FOREIGN PATENT DOCUMENTS

WO WO-2018224695 A1 * 12/2018 ............. G06N 3/006

OTHER PUBLICATIONS

Human-level performance in first-person multiplayer games with population-based deep reinforcement earning—Max Jaderberg et al. (Year: 2018)—IDS entry.*
(Continued)

*Primary Examiner* — Quan M Hua
(74) *Attorney, Agent, or Firm* — Fish & Richardson P.C.

(57) ABSTRACT

Methods, systems, and apparatus, including computer programs encoded on a computer storage medium, for training a policy neural network having a plurality of policy parameters and used to select actions to be performed by an agent to control the agent to perform a particular task while interacting with one or more other agents in an environment. In one aspect, the method includes: maintaining data specifying a pool of candidate action selection policies; maintaining data specifying respective matchmaking policy; and training the policy neural network using a reinforcement learning technique to update the policy parameters. The policy parameters define policies to be used in controlling the agent to perform the particular task.

30 Claims, 3 Drawing Sheets

(58) Field of Classification Search
CPC . G06T 2207/20081; G06T 2207/20224; G06T 19/006; G06T 2207/10016; G06T 2207/20084; G06T 3/4046; G06T 5/001; G06T 7/0002; G06T 7/254; G06T 9/002; G06T 2207/10024; G06T 2207/20076; G06T 2207/30164; G06T 7/0008; G06T 13/40; G06T 17/00; G06T 19/00; G06T 19/20; G06K 9/6256; G06K 9/00523; G06K 9/6223
See application file for complete search history.

(56) References Cited

OTHER PUBLICATIONS

International Preliminary Report on Patentability in International Appln. No. PCT/EP2020/051839, dated Aug. 5, 2021, 12 pages.
Balduzzi et al., "Open-ended Learning in Symmetric Zero-sum Games," Proceedings of the 36th International Conference on Machine Learning, May 2019, 10 pages.
Brown, "Iterative Solution of Games by Fictitious Play," Activity Analysis of Production and Allocation, 1951, Chapter 24, 374-376.
Buro, "ORTS: A Hack-Free RTS Game Environment," International Conference on Computers and Games, 2002, 280-291.
Buro, "Real-Time Strategy Games: A New AI Research Challenge," Intl Joint Conf. Artificial Intelligence, Aug. 2003, 2 pages.
Campbell et al., "Deep Blue," Artificial Intelligence, Jan. 2002, 134(1-2):57-83.
Christiano et al., "Deep Reinforcement Learning from Human Preferences," Proceedings of the 31st International Conference on Neural Information Processing Systems, Dec. 2017, 9 pages.
Churchill et al., "An Analysis of Model-Based Heuristic Search Techniques for StarCraft Combat Scenarios," Artificial Intelligence and Interactive Digital Entertainment Conf., Sep. 2017, 7 pages.
Czarnecki et al., "Mix&Match—Agent Curricula for Reinforcement Learning," https://arxiv.org/abs/1806.01780, Jun. 2018, 12 pages.
deepmind.com [online], "AlphaStar: Mastering the Real-Time Strategy Game StarCraft II," Jan. 24, 2019, retrieved on Apr. 21, 2020, retrieved from URL <https://deepmind.com/blog/article/alphastar-mastering-real-time-strategy-game-starcraft-ii>.
Espeholt et al., "IMPALA: Scalable Distributed Deep-RL with Importance Weighted Actor-Learner Architectures," https://arxiv.org/abs/1802.01561v3, last revised Jun. 2018, 22 pages.
Farooq et al., "StarCraft AI Competition: A Step Toward Human-Level AI for Real-Time Strategy Games," AI Magazine, Jul. 2016, 37:102-107.
He et al., "Deep Residual Learning for Image Recognition," 2016 IEEE Conference on Computer Vision and Pattern Recognition (CVPR), Jun. 2016, 770-778.
Heinrich et al., "Fictitious Self-Play in Extensive-Form Games," Proceedings of the 32nd International Conference on Machine Learning, Jun. 2015, 9 pages.
Hinton et al., "Distilling the Knowledge in a Neural Network," https://arxiv.org/abs/1503.02531, Mar. 2015, 9 pages.
Hochreiter et al., "Long Short-Term Memory," Neural Computation, Nov. 1997, 9(8):1735-1780.
Hsieh et al., "Building a Player Strategy Model by Analyzing Replays of Real-Time Strategy Games," 2008 IEEE International Joint Conference on Neural Networks (IEEE World Congress on Computational Intelligence), Jun. 2008, 3106-3111.
Ibarz et al., "Reward learning from human preferences and demonstrations in Atari," Proceedings of the 32nd International Conference on Neural Information Processing Systems, Dec. 2018, 13 pages.
Jaderberg et al., "Human-level performance in 3D multiplayer games with population-based reinforcement learning," Science, May 2019, 364(6443):7 pages.

Jouppi et al., "In-Datacenter Performance Analysis of a Tensor Processing Unit," https://arxiv.org/abs/1704.04760, Apr. 2017, 17 pages.
Justesen et al., "Learning Macromanagement in StarCraft from Replays using Deep Learning," 2017 IEEE Conference on Computational Intelligence and Games (CIG), Aug. 2017, 162-169.
Kingma et al., "Adam: A Method for Stochastic Optimization," https://arxiv.org/abs/1412.6980v9, last revised Jan. 2017, 15 pages.
Lanctot et al., "A Unified Game-Theoretic Approach to Multiagent Reinforcement Learning," Proceedings of the 31st International Conference on Neural Information Processing Systems, Dec. 2017, 14 pages.
LeCun et al., "Deep learning," Nature 521, May 2015, 436-444.
Leslie et al., "Generalised weakened fictitious play," Games and Economic Behavior, Aug. 2006, 56(2):285-298.
Metz et al., "Discrete Sequential Prediction of Continuous Actions for Deep RL," https://arxiv.org/abs/1705.05035v1, May 2017, 24 pages.
Mikolov et al., "Recurrent Neural Network Based Language Model," INTERSPEECH 2010, Sep. 2010, 1045-1048.
Mnih et al., "Asynchronous Methods for Deep Reinforcement Learning," https://arxiv.org/abs/1602.01783v2, last revised Jun. 2016, 19 pages.
Mnih et al., "Asynchronous Methods for Deep Reinforcement Learning," Proceedings of The 33rd International Conference on Machine Learning, Jun. 2016, 10 pages.
Mnih et al., "Human-level control through deep reinforcement learning," Nature, Feb. 2015, 518:529-533.
Nair et al., "Overcoming Exploration in Reinforcement Learning with Demonstrations," 2018 IEEE International Conference on Robotics and Automation (ICRA), May 2018, 6292-6299.
Oh et al., "Self-Imitation Learning," https://arxiv.org/abs/1806.05635, Jun. 2018, 13 pages.
Parisotto et al., "Actor-Mimic: Deep Multitask and Transfer Reinforcement Learning," https://arxiv.org/abs/1511.06342v4, last revised Feb. 2016, 16 pages.
Pathak et al., "Curiosity-Driven Exploration by Self-Supervised Prediction," 2017 IEEE Conference on Computer Vision and Pattern Recognition Workshops (CVPRW), Jul. 2017, 488-489.
PCT International Search Report and Written Opinion in International Appln. No. PCT/EP2020/051839, dated May 13, 2020, 18 pages.
Perez et al., "FiLM: Visual Reasoning with a General Conditioning Layer," https://arxiv.org/abs/1709.07871v2, last revised Dec. 2017, 13 pages.
Pourchot et al., "CEM-RL: Combining evolutionary and gradient-based methods for policy search," https://arxiv.org/abs/1810.01222v1, Oct. 2018, 17 pages.
Precup et al., "Eligibility Traces for Off-Policy Policy Evaluation," ICML '00 Proc. 17th Intl Conf. Machine Learning, retrieved from URL <https://scholarworks.umass.edu/cgi/viewcontent.cgi?article=1079&context=cs_faculty_pubs>, Jan. 2000, 9 pages.
Rusu et al., "Policy Distillation," https://arxiv.org/abs/1511.06295v2, last revised Jan. 2016, 13 pages.
Samvelyan et al., "The StarCraft Multi-Agent Challenge," Proceedings of the 18th International Conference on Autonomous Agents and MultiAgent Systems, May 2019, 2186-2188.
Schulman et al., "Proximal Policy Optimization Algorithms," https://arxiv.org/abs/1707.06347v2, last revised Aug. 2017, 12 pages.
Shao et al., "StarCraft Micromanagement With Reinforcement Learning and Curriculum Transfer Learning," IEEE Transactions on Emerging Topics in Computational Intelligence, Feb. 2019, 12 pages.
Silver et al., "A general reinforcement learning algorithm that masters chess, shogi, and Go through self-play," Science, Dec. 2018, 362(6419):6 pages.
Silver et al., "Mastering the game of Go with deep neural networks and tree search," Nature, Jan. 2016, 529:484-489.
starcraft2.com [online], "DeepMind Research on Ladder," Jul. 2019, retrieved on May 7, 2020, retrieved from URL <https://starcraft2.com/en-us/news/22933138>, 6 pages.

(56) References Cited

OTHER PUBLICATIONS

Sun et al., "TStarBots: Defeating the Cheating Level Builtin AI in StarCraft II in the Full Game," https://arxiv.org/abs/1809.07193v3, last revised Dec. 2018, 24 pages.
Sutton, "Learning to Predict by the Method of Temporal Differences," Machine Learning, Aug. 1988, 3:9-44.
Synnaeve et al., "A Bayesian Model for Plan Recognition in RTS Games applied to StarCraft," Artificial Intelligence and Interactive Digital Entertainment Conf., Nov. 2011, 7 pages.
Synnaeve et al., "Forward Modeling for Partial Observation Strategy Games—A StarCraft Defogger," Advances in Neural Information Processing Systems 31 (NIPS 2018), Dec. 2018, 11 pages.
torchcraft.github.io [online], "TorchCraftAI," Nov. 2018, retrieved on May 7, 2020, retrieved from URL <https://torchcraft.github.io/TorchCraftAI/>, 2 pages.
Uchibe, "Cooperative and Competitive Reinforcement and Imitation Learning for a Mixture of Heterogeneous Learning Modules," Front. Neurorobot., Sep. 2018, 12(61):11 pages.
Uriarte et al., "Improving Monte Carlo Tree Search Policies in StarCraft via Probabilistic Models Learned from Replay Data," Artificial Intelligence and Interactive Digital Entertainment Conf., Jan. 2016, 100-106.
Usunier et al., "Episodic Exploration for Deep Deterministic Policies: An Application to StarCraft Micromanagement Tasks," https://arxiv.org/abs/1609.02993v3, Nov. 2016, 18 pages.
Vaswani et al., "Attention is All vou Need," Advances in Neural Information Processing Systems 30 (NIPS 2017), Dec. 2017, 11 pages.
Vinyals et al., "AlphaStar: Mastering the Real-Time Strategy Game StarCraft II," retrieved from URL<https://deepmind.com/blog/article/alphastar-mastering-real-time-strategy-game-starcraft-ii>, Jan. 2019, retrieved on May 6, 2020, 14 pages.
Vinyals et al., "Pointer Networks," Adv. Neural Information Process. Syst. 28, Dec. 2015, 9 pages.
Vinyals et al., "StarCraft II: A New Challenge for Reinforcement Learning," https://arxiv.org/abs/1708.04782, Aug. 2017, 20 pages.
Wang et al., "Sample Efficient Actor-Critic with Experience Replay," Phttps://arxiv.org/abs/1611.01224v2, last revised Jul. 2017, 20 pages.
Weber et al., "Case-Based Reasoning for Build Order in Real-Time Strategy Games," Proceedings of the Fifth AAAI Conference on Artificial Intelligence and Interactive Digital Entertainment, Oct. 2009, 6 pages.
Wolski et al.,"OpenAI Five," retrieved from URL <https://blog.openai.com/openai-five/>, Jun. 2018, 10 pages.
Zambaldi et al., "Relational Deep Reinforcement Learning," https://arxiv.org/abs/1806.01830v2, Jun. 2018, 15 pages.

* cited by examiner

MULTI-AGENT REINFORCEMENT LEARNING WITH MATCHMAKING POLICIES

CROSS-REFERENCE TO RELATED APPLICATION

This application claims priority to U.S. Provisional Application Ser. No. 62/894,633, filed on Aug. 30, 2019, and U.S. Provisional Application Serial No. 62/796,567, filed on Jan. 24, 2019. The disclosure of the prior applications are considered part of and are incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes techniques for reinforcement learning which use interactions between agents to achieve better final performance on a task. The agents may interact cooperatively or competitively, that is some or all of the agents may either cooperate or compete to perform the task.

In one aspect there is described a method of training a policy neural network having a plurality of policy parameters and used to select actions to be performed by an agent to control the agent to perform a particular task while interacting with one or more other agents in an environment. The method comprises maintaining data specifying a pool of candidate action selection policies. The pool of candidate action selection policies comprises a plurality of learner polices for controlling the agent, each learner policy defined by a respective set of values for the policy parameters of the policy neural network; and one or more fixed policies for controlling the agent.

The method further comprises maintaining, for each of the learner policies, data specifying a respective matchmaking policy for the learner policy that defines a distribution over the pool of candidate action selection policies. At each of a plurality of training iterations, and for each of one or more of the learner policies, the method involves selecting one or more policies from the pool of candidate action selection policies using the matchmaking policy for the learner policy i.e. according to the defined distribution; generating training data for the learner policy by causing a first agent controlled using the learner policy to perform the particular task while interacting with one or more second agents, where each second agent is controlled by a respective one of the selected policies; and updating the respective set of policy parameters that define the learner policy by training the learner policy on the training data through reinforcement learning to optimize a reinforcement learning loss function for the learner policy. Optionally the policy parameters for the second agent(s) may also be updated based on respective reinforcement learning loss function(s).

In implementations of the method the learner policies can learn from one another and/or from the fixed policies. Thus the learner policies can improve together. For example one learner policy may be guided by another policy to respond differently to the environment, for example to explore a different region of state space for the task; or one learner policy may be encouraged by another policy towards a different strategy i.e. to explore a different region of a strategic space of the task. Thus the policies in the pool are enabled to learn collectively, and collectively are enabled to learn to hard tasks with a large state or strategic space. To achieve this the interaction between one learner policy and another policy may be cooperative or competitive.

A matchmaking policy may be a policy for selecting, from the pool of candidate action selection policies, a policy for each second agent. Each learner policy has a respective matchmaking policy and the matchmaking policies (and corresponding distributions) for two or more of the learner policies are typically different. For example types or categories of learner policy may be defined, each with a different respective matchmaking policy. For example, a matchmaking policy (distribution) may be to select from a particular type of learner policy only, with a uniform probability i.e. according to a uniform distribution. Or a matchmaking policy may select from only the learner policies (i.e. not from the fixed policies), or from all the policies, with a uniform probability. Using different matchmaking policies encourages diversity amongst the interactions, and hence encourages exploration of the state and strategic spaces. In some implementations a matchmaking policy may allocate a higher likelihood of selection to those policies which exhibit a relatively higher performance, determined, e.g., from a value of their respective reinforcement learning loss function.

A reinforcement learning loss function for a learner policy is defined by the type of reinforcement learning used to train the learner policy neural network defining the learner policy. There are many different neural network architectures and training algorithms which may be used and the pool of candidate action selection policies may, but need not, include policies defined by multiple different neural network architectures. In one implementation a distributed advantage actor-critic reinforcement learning is used; some examples of reinforcement learning algorithms are described in arXiv: 1602.01783 (Mnih et al.). On-policy learning can help to align the behavior policy of an actor neural network and a target policy of a learner neural network of the policy neural network.

The reinforcement learning (RL) loss function may depend upon one or more hyperparameters, i.e., parameters which are fixed, not updated, when updating the policy parameters to optimize the reinforcement learning loss function. These may include parameters which define a learning rate, entropy cost, reward discounting, weights applied to component parts of the RL loss function, and so forth. In implementations of the method values of the hyperparameters are different for two or more of the learner policies, again to encourage diversity.

Optionally the RL loss function may also be dependent upon an internal reward. The internal reward may, for example, be a reward relevant to performing the particular task, received before task is completed and defined according to a state of the environment and/or agent(s). Thus the one or more hyperparameters on which the RL loss function depends may include one more internal reward hyperparameters that define whether and how the RL loss function depends on the internal reward.

In some implementations the method includes supervised learning, for example as an initial stage for training one or more of the fixed policies to "seed" the pool. There may be more than one stage of supervised learning, for example a first stage for initial training and a a second stage for training the policies of agents that have reached a threshold level of performance on the particular task. The training data for the supervised learning may be derived from humans or trained machine-learning systems.

The method may include converting a learner policy into a fixed policy, for example after a predetermined number of training iterations or after a threshold level of performance on the particular task has been reached. The learner policy parameters may then be updated to those of another policy in the pool, e.g., those of another fixed policy, and the hyperparameters and/or the matchmaking policy of the learner policy may be modified to encourage exploration. In this way the overall performance of the pool of policies may be ratcheted upwards.

The subject matter described in this specification can be implemented in particular embodiments so as to realize one or more of the following advantages. Tasks that require an agent to interact with other agents in order to effectively perform the task generally have an extremely large state space and an extremely large strategic space, i.e., many different policies can be implemented to select actions for the agent. By employing the described techniques, a policy network can be trained in order to effectively control an agent to perform such tasks. In particular, by maintaining a pool of candidate policies, with each learner policy in the pool potentially having a different matchmaking policy, the system can account for different strategies being employed by different policies in the pool. By having different policies using different loss functions and exploring the space of possible loss functions throughout training, the system effectively accounts for the large state space and the large strategic space during the training of the policy neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
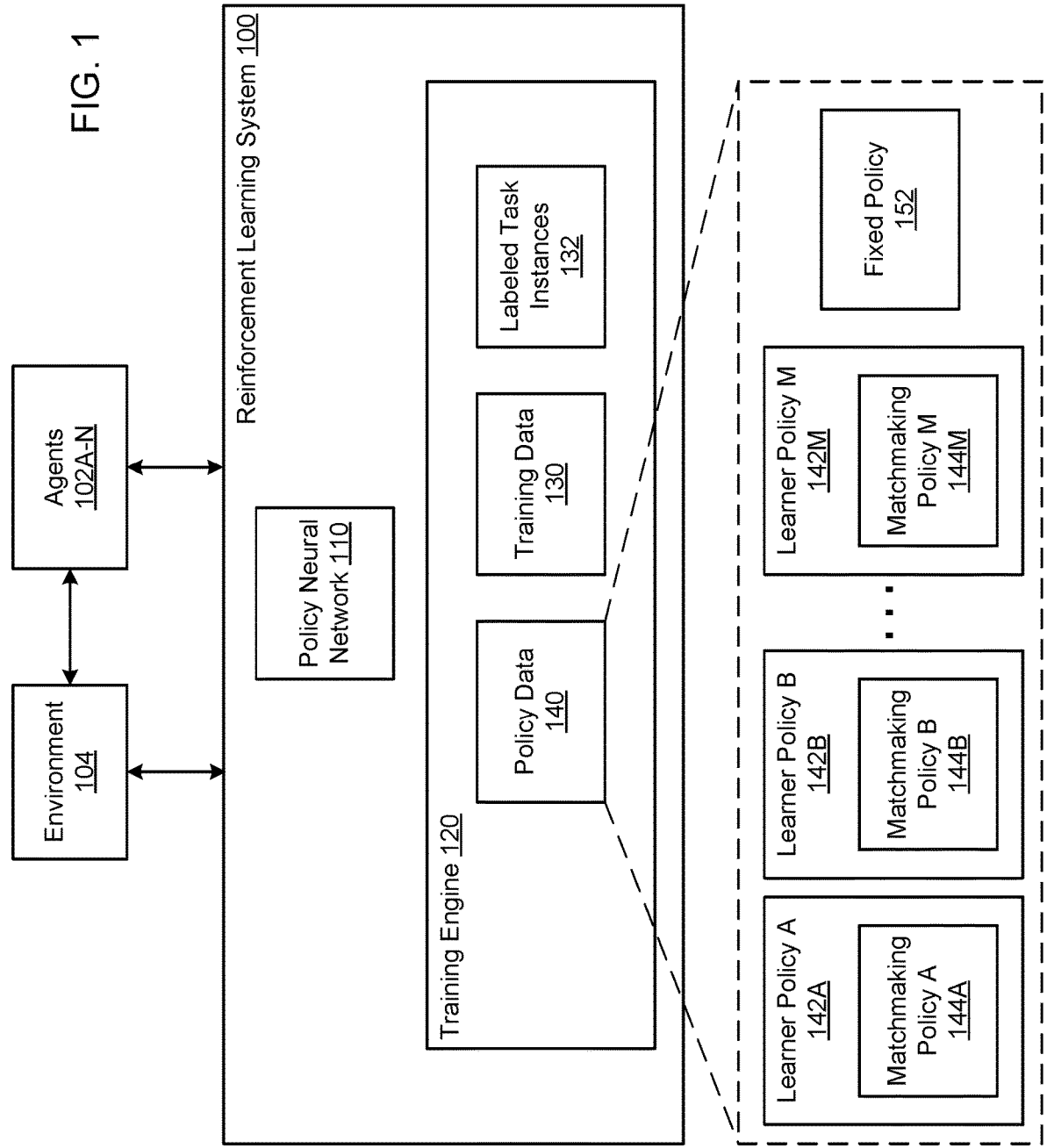
FIG. 1 shows an example reinforcement learning system.

In broad terms a reinforcement learning system is a system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment is referred to in this specification as an observation.

More specifically, this specification describes a system implemented as one or more computer programs on one or more computers in one or more physical locations that trains a policy neural network that is used to select actions to be performed by an agent in order to control the agent to perform a particular task while interacting with one or more other agents in the environment.

In some implementations, the environment is a real-world environment and the agent is a mechanical agent interacting with the real-world environment. For example, the agent may be a robot interacting with the environment to accomplish a specific task that involves interacting with other agents, e.g., other robots in a factory or other industrial facility. As another example, the agent may be an autonomous or semi-autonomous land or air or sea vehicle navigating through the environment and the other agents are other vehicles also navigating through the environment.

In these implementations, the observations may include, for example, one or more of images, object position data, and sensor data to capture observations as the agent as it interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control inputs to mechanically control the robot or other agent, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g., braking and/or acceleration of the vehicle.

In some implementations the environment is a simulated environment and the agent is implemented as one or more computers interacting with the simulated environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle. Once trained in simulation, the system may further be used to control an agent in real world, i.e., by processing new input data characterizing respective states of real-world environments and generating corresponding action selection outputs.

In another example, the simulated environment may be a video game and the agent may be a simulated user playing the video game.

In some implementations, the environment is a cybersecurity environment. For example, the observations can be data characterizing the state of a computer network or a distributed computing system and the actions can be actions to defend the computer system against a cybersecurity attack by one or more other agents.

As previously described, during training the agents interact, cooperatively or competitively. Thus some implementations of the method may be used to provide one or more final action selection policies from the pool for controlling more than one agent to perform the particular task: two or more agents may cooperate or compete to perform the particular task. For example the agents may be robots or robotic vehicles and the task may be to move, put or place, or otherwise manipulate or control one or more objects, e.g., to assemble or dismantle parts of a complex object or to store/remove objects in/from a warehouse. In another example the agents may comprise control devices for physical, mechanical, electronic or other industrial plant and the task may be to control components of the plant to control resource use, e.g., to reduce water or reduce electrical power consumption. In another example the agents may control a chemical or biological, e.g., to perform a task of assembling chemical or biological components into an end product. In another example the agents may implement routing actions to electrically connect components of an integrated circuit such as an ASIC.

Generally in the case of a simulated environment the observations may include simulated versions of one or more of the previously described observations or types of observations and the actions may include simulated versions of one or more of the previously described actions or types of actions.

Optionally, in any of the above implementations, the observation at any given time step may include data from a previous time step that may be beneficial in characterizing the environment, e.g., the action performed at the previous time step, the reward received at the previous time step, and so on.

FIG. 1 shows an example reinforcement learning system 100. The reinforcement learning system 100 is an example of a system implemented as computer programs on one or more computers in one or more locations, in which the systems, components, and techniques described below are implemented.

The reinforcement learning system 100 selects actions to be performed by a reinforcement learning agent, e.g., agent 102A, interacting (e.g., competing or coordinating) with one or more other reinforcement learning agents, e.g., agents 102B-N, in an environment 104. That is, the reinforcement learning system 100 receives observations, with each observation characterizing a respective state of the environment 104, and, in response to each observation, selects an action from a predetermined set of actions to be performed by the reinforcement learning agent 102A in response to the observation.

In response to some or all of the actions performed by the agent 102A, the reinforcement learning system 100 receives a reward. Each reward is a numeric value received from the environment 104 as a consequence of the agent 102A performing an action, i.e., the reward will be different depending on the state that the environment 104 transitions into as a result of the agent 102A performing the action. In particular, the reinforcement learning system 100 selects actions to be performed by the agent 102A using a policy neural network 110 and a training engine 120.

Generally, the policy neural network 110 is a neural network that is configured to receive a network input including an observation and to process the network input in accordance with parameters of the policy neural network ("policy parameters") to generate a network output.

The network output includes an action selection output and, in some cases, a predicted expected return output. The action selection output defines an action selection policy for selecting an action to be performed by the agent in response to the input observation.

In some cases, the action selection output defines a probability distribution over possible actions to be performed by the agent. For example, the action selection output can include a respective action probability for each action in a set of possible actions that can be performed by the agent to interact with the environment. In another example, the action selection output can include parameters of a distribution over the set of possible actions.

In some other cases, the action selection output includes a respective action-value estimate (e.g., Q value) for each of a plurality of possible actions. A Q value for a possible action represents an expected return to be received if the agent performs the possible action in response to the observation.

In some cases, the action selection output identifies an optimal action from the set of possible actions to be performed by the agent in response to the observation. For example, in the case of controlling a mechanical agent, the action selection output can identify torques to be applied to one or more joints of the mechanical agent.

When used, the predicted expected return output for a given observation is an estimate of a return resulting from the environment being in the state characterized by the observation, with the return being a combination, e.g., a time-discounted sum, of numeric rewards received as a result of the agent interacting with the environment. Generally, the rewards reflect the progress of the agent toward accomplishing the specified result. In many cases, the rewards will be sparse, with the only reward being received being at a terminal state of any given episode of interactions and indicating whether the specified result was achieved or not.

To allow an agent (e.g., agent 102A) to better perform the particular task by more effectively interacting with the environment 104, with the other agents (e.g., agents 102B-N) in the environment 104, or both, the reinforcement learning system 100 includes a training engine 120 that trains the policy neural network 110 to determine trained values of the parameters of the policy neural network 110.

During the training of the policy neural network 110, the system maintains policy data 140 specifying a pool of candidate action selection policies. The pool of candidate action selection policies includes (i) a plurality of learner polices 142A-M for controlling the agent, each learner policy defined by a respective set of values for the policy parameters of the policy neural network 110, and (ii) one or more fixed policies 152 for controlling the agent. Each fixed policy 152 may also be defined by fixed values of the policy parameters or may instead or in addition be hard-coded policies or other policies that select actions in response to observations.

Although three learner policies are depicted in FIG. 1 for convenience, the reinforcement learning system 100 may include data specifying a different number of learner policies. Similarly, although only one fixed policy is depicted in FIG. 1 for convenience, the reinforcement learning system 100 may include data specifying multiple fixed policies that are different from each other.

In addition, the system 100 maintains data specifying a respective matchmaking policy 144A-M for each of the learner policies 142A-M. Each matchmaking policy defines a distribution over the pool of candidate action selection policies which can include, for example, the plurality of learner policies 142A-M, the one or more fixed policies 152, and any other candidate action selection policies that can be employed in controlling the agents.

To assist in the training of the policy neural network 110, the training engine 120 also maintains training data 130.

The training engine 120 trains the policy neural network 110 by repeatedly generating training data 130 and training the policy neural network 110 on the training data 130 to update respective sets of policy parameters that define the plurality of learner policies 142A-M.

In particular, to improve overall quality of the training by providing better learning signals, when generating training data for any given one of the learner policies 142A-M, the training engine 120 makes use of other candidate action selection policies that are selected using the respective matchmaking policies for the learner policies. The provision of these other policies assists in identifying potential weaknesses or flaws of the learner policies and, in turn, facilitates higher quality updates to policy parameters. Training the policy neural network 110 is described in more detail below.

More specifically, the training data 130 stores a set of experiences generated as a consequence of the interaction of the agent with one or more other agents in the environment 104 for use in training the policy network 110.

In some implementations, the experiences are off-policy experiences. An experience is said to be off-policy if the action selection policy used to select the actions ("behavior policy") included in the experience is, as of the time at which the policy neural network is trained on the experience, different than the action selection policy defined by the current parameter values of the policy network being trained ("learner policy").

In some implementations, the training engine 120 also stores a set of labeled task instances 132 for use in supervised learning training which can take place either before or during the RL training of the system. The training engine 120 can use supervised learning training to determine initial values of the policy parameters, maintain diverse exploration of potential action selection policies, or both. The labeled task instances 132 are generated as a consequence of supervised agents performing the particular task while interacting with the one or more other agents in the environment 104. For example, the labeled task instances can be generated as a consequence of control of an agent by a human or another, already trained machine learning system. In other words, the labeled task instances include data specifying respective supervised outputs (e.g., action selection outputs that are selected by another entity in response to receiving the observations).

Figure 2:
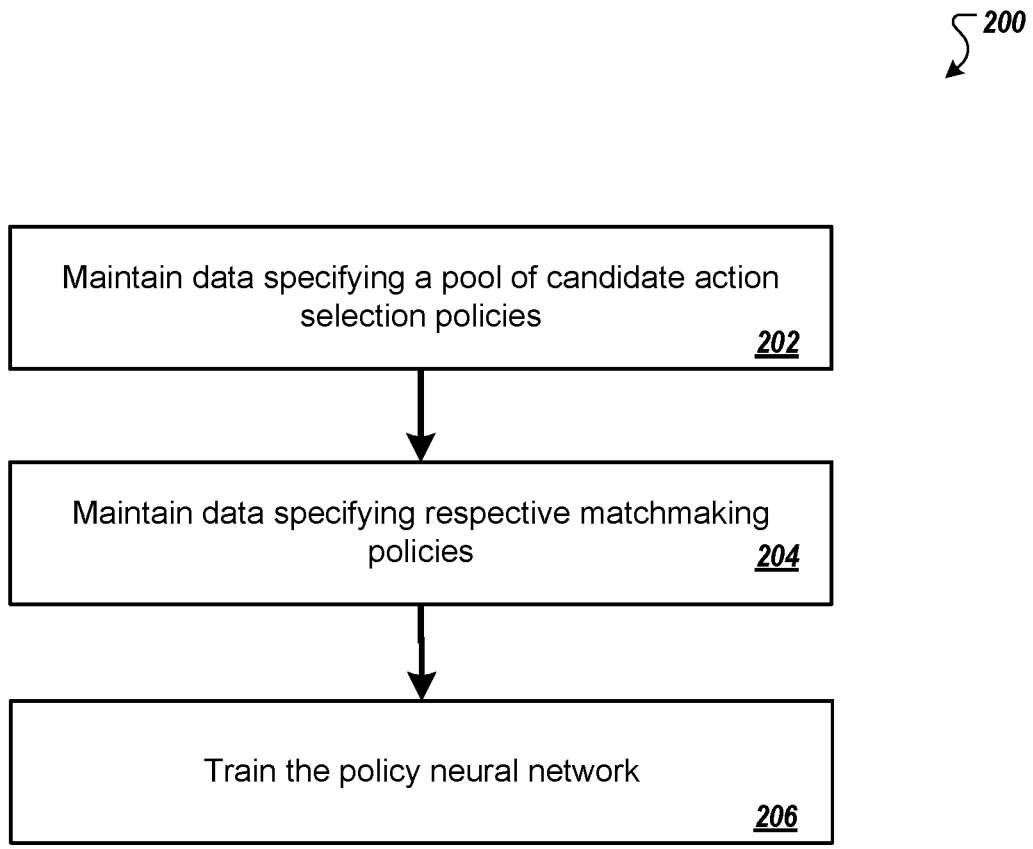
FIG. 2 is a flow chart an example process for training a policy neural network.

FIG. 2 is a flow chart of an example process 200 for training a policy neural network. For convenience, the process 200 will be described as being performed by a system of one or more computers located in one or more locations. For example, a reinforcing learning system, e.g., the reinforcing learning system 100 of FIG. 1, appropriately programmed in accordance with this specification, can perform the process 200.

The system maintains data specifying a pool of candidate action selection policies (202). The pool of candidate action selection policies includes a plurality of learner polices for controlling the agent. Each learner policy is defined by a respective set of values for the policy parameters of the policy neural network In addition, the pool of candidate action selection policies includes one or more fixed policies for controlling the agent. Each fixed policy may also be defined by values of the policy parameters or may instead or in addition be deterministic policies or other policies that select actions in response to observations.

In some implementations, the system initializes the pool of candidate action selection policies through supervised learning techniques. That is, the system uses supervised learning to determine initial values for some or all of the policy parameters. The initial values of the policy parameter in turn define the initialized learner policies, and, optionally, the initialized fixed policies.

The system can do so by training the policy neural network on labeled task instances to optimize a supervised learning objective function, e.g., a KL divergence objective function, evaluating respective performances of the agents controlled using the policy neural network, i.e., relative to the performance of supervised agents, with respect to policy parameters.

Advantageously, in order to initialize the candidate action selection policies in a more refined manner, the system specifically trains the policy neural network on a selected portion of the labeled task instances. The selected portion include only labeled task instances performed by agents that have attained at least a threshold level of performance on the particular task. For example, the system specifically trains the network on selected labeled task instances in which respective rewards received by the supervised agent are greater than an average reward received by the supervised agent in all labeled task instances.

In some implementations, the system maintains learner policies that are of different types. For example, the system can assign a respective type from a plurality of types to each of the plurality of learner policies. Different types of leaner policies generally employ different strategies for controlling an agent which, in turn, may result in different action selection outputs even in response to the same observation. Because of this, and as will be described in more detail below with reference to FIG. 3, the system can update different types of learner policies using different reinforcement learning loss functions.

The system maintains data specifying respective matchmaking policies (204) for the plurality of learner policies.

Specifically, for each of the learner policies, a respective matchmaking policy defines a probability distribution over the pool of candidate action selection policies. The exact distributions over candidate action selection policies specified by the respective matchmaking policies may vary, but typically, the matchmaking policies for two or more of the learner policies are different from one another. During training, the system can select, from the pool of policies and in accordance with such probability distributions, one or more other candidate action selection policies for use in assisting the update of the learner policies.

Mathematically, for each learner policy A, the system can select an action selection policy B from the pool of candidate action selection policies $c_1$-$c_n \in C$ with probability $$\frac{f(P(B))}{\sum_{c \in C} f(P(C))},$$ (Equation 1)

where $f: [0,1] \to [0, \infty)$ is a weighting function, and P defines respective probability score (i.e., a score between 0 and 1, inclusive) assigned to the pool of candidate action selection policies. For example, for each action selection policy, the probability score defined by P is proportional to a level of performance (e.g., as measured by received rewards or some other performance metric) of the policy in controlling an agent to perform the particular task when the policy was selected last time.

In implementations where the plurality of learner policies are each assigned a respective type from a plurality of types, the system can associate each type with a different matchmaking policy from each other type. In other words, the system assigns, to each learner policy, a corresponding matchmaking policy that is associated with the type to which the learner policy is assigned.

For example, the matchmaking policy for at least one learner policy is uniform across one or more learner policies that are assigned a particular type and zero for all of the learner policies that are assigned different types and all of the fixed policies. In a more concrete example, if the task is a competing task and to better update a learner policy to control the agent to defend against other adventurist agents, the matchmaking policy for the learner policy is uniform across, i.e., uses the weighting function f to assign a same weight to, the type of learner policies that employs risky strategies by controlling the agent to take quick and surprising actions, and zero for all of the learner policies that are assigned different types and all of the fixed policies.

As another example, the matchmaking policy for at least one learner policy is uniform across all of the learner policies and zero for all of the fixed policies.

As another example, the matchmaking policy for at least one learner policy is uniform across all policies in the pool.

As yet another example, the matchmaking policy for at least one learner policy specifies that the learner policies controlling respective agents to have attained higher levels of performance on the particular task are more likely to be selected. As shown in Equation 1, this can be achieved by using the weighting function f to assign greater weights to such learner policies.

The system trains the policy neural network (206) using an iterative approach. In other words, the system updates one or more of the learner policies at each of a plurality of training iterations. As will be described in further detail with reference to FIG. 3, briefly, at each training iteration, for each of the one or more learner policies, the system selects one or more policies from the pool of candidate action selection policies using the matchmaking policy for the learner policy; generates training data for the learner policy by causing a first agent controlled using the learner policy to perform the particular task while interacting with one or more second agents, each second agent controlled by a respective one of the selected policies; and updates the respective set of policy parameters that define the learner policy by training the learner policy on the training data through reinforcement learning to optimize a reinforcement learning loss function for the learner policy.

Figure 3:
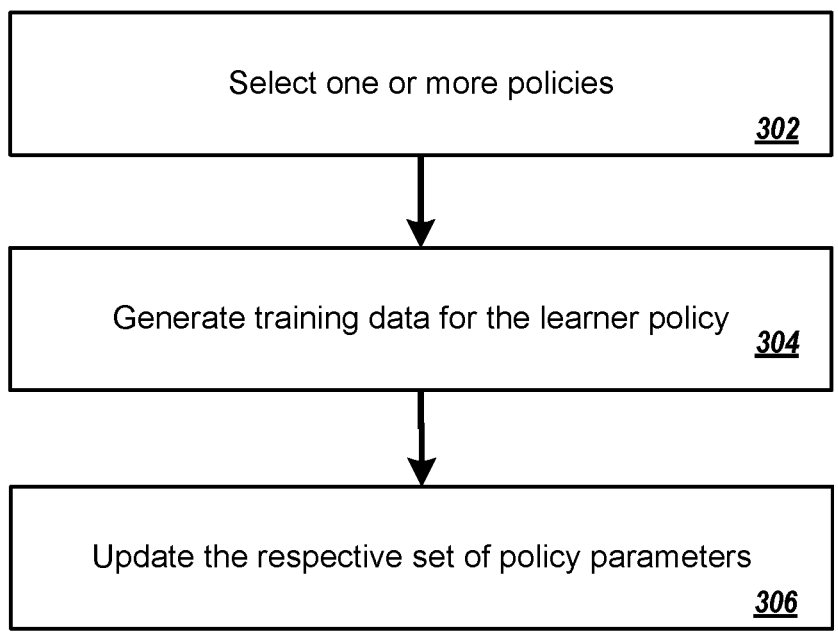
FIG. 3 is a flow chart of an example process for updating one or more learner policies based on training data.

FIG. 3 is a flow chart of an example process 300 for updating one or more learner policies based on training data. For convenience, the process 300 will be described as being performed by a system of one or more computers located in one or more locations. For example, a reinforcing learning system, e.g., the reinforcing learning system 100 of FIG. 1, appropriately programmed in accordance with this specification, can perform the process 300.

In general, the system can repeatedly perform the process 300 for different learner policies from the pool of candidate action selection policies.

Specifically, for each of one or more of the leaner policies, the system selects one or more policies (302) from the pool of candidate action selection policies using the matchmaking policy for the learner policy. For each learner policy, a respective matchmaking policy defines a probability distribution over the pool of candidate action selection policies. The system can then select one or more policies for the learner policy by sampling from the probability distribution or by selecting the policies with the highest probabilities. Because different types of tasks may involve different numbers of agents cooperating or competing with each other, the system can select any number of policies that is appropriate for the type of the particular task.

The system generates training data (304) for the learner policy. The training data include a set of experiences generated as a result of causing a first agent controlled using the learner policy to perform the particular task while interacting with one or more second agents. Each second agent is controlled by a respective one of the selected policies. As such, each experience represents information about an interaction of the first agent with one or more other agents in the environment.

The system updates the respective set of policy parameters (306) that define the learner policy by training the learner policy on the training data through reinforcement learning to optimize a reinforcement learning loss function for the learner policy. The reinforcement learning loss function can be any reinforcement learning loss function that is appropriate for the type of the outputs that the policy neural network generates and the interaction specified by the collected experiences. Some example reinforcement learning loss functions are described below.

In various cases, the one or more policies that are selected at step 302 involve at least one learner policy. In such cases, the system can optionally also update the respective set of policy parameters that define the selected policy by training the selected policy on the training data through reinforcement learning to optimize a reinforcement learning loss function for the selected policy.

During the training, the system can evaluate a measure of performance of an agent that is controlled using a learner policy by computing a value of the reinforcement learning loss function with respect to policy parameters. The system then updates respective current values of the policy parameters to improve the agent performance by encouraging the policy neural network to generate higher quality action selection outputs. Higher quality action selection outputs generally refer to outputs specifying actions that can improve (e.g., increase) total future rewards to be received by the agent upon performing the actions.

Specifically, the system can do so by using a Q-learning technique, a policy gradient technique, or a mixture of both techniques. For example, the Q-learning technique can be a Temporal-Difference (TD) learning technique. As another example, the policy gradient technique can be an Actor-Critic technique, an Advantage Actor-Critic, or a V-trace technique. As yet another example, the policy gradient technique can be an upgoing policy update (UPGO) technique, which updates the policy parameters in the direction of $p_t(G_t^U - V_o(s_t,z))\nabla_\theta \log \pi n_\theta(\alpha_t|s_t,z)$ (Equation 2), where $$G_t^U = \begin{cases} r_t + G_{t-1}^U & \text{if } Q(s_{t-1}, a_{t+1}, z) \geq V_\theta(s_{t+1}, z) \\ r_t + V_\theta(s_{t+1}, z) & \text{otherwise} \end{cases}$$

is an upgoing return, z is an optional statistic that summarizes a strategy sampled from supervised outputs, t is the time step of a state, r is received reward, $\theta$ are policy parameters, $Q(s_t, \alpha_t, z)$ is the action-value estimate, V is the value estimate (i.e., estimate of expected total future rewards), $$\rho_t = \min\left(\frac{\pi_\theta(a_t | s_t, z)}{\pi_{\theta'} \cdot (a_t | s_t, z)}, 1\right)$$

is a clipped importance ratio, and $\pi_\theta$ is the policy that generated the experience.

In general, each reinforcement learning loss function can be defined by a respective plurality of hyperparameters. A hyperparameter is a value that is set prior to the commencement of the training of the policy neural network and that impacts the computation of the reinforcement learning loss functions. Different hyperparameters can define different evaluation criteria that are being adopted in the loss functions.

For example, the hyperparameters include one or more hyperparameters of a reinforcement learning algorithm used in the training.

As another example, the hyperparameters include one or more internal reward hyperparameters that define whether the reinforcement learning loss function depends on an internal reward and, if so, how the internal reward is computed based on observations received by the agent during performance of the task. Briefly, the internal rewards can be any appropriate feedback or observations that are used by the system in cases where the rewards received from the environment ("true rewards") are sparse or insufficient and therefore do not provide enough learning signals to the agent. In the case where the agent is a robot, examples of internal rewards can include rewards computed based on distance travelled in the environment, number of items interacted with in the environment, or distance from a goal location in the environment. In particular, in this example, the hyperparameters can control a measure of attention to such internal rewards (e.g., relative to the true rewards) when evaluating the RL loss functions.

In some implementations, the system uses different reinforcement learning loss functions when training different types of learner policies. That is, the values for the plurality of hyperparameters for two or more types of the learner policies can be different. By doing so, the system can explore the space of possible loss functions to better account for the different strategies being employed by different policies in the pool.

In some implementations, at various time points during the training, the system converts a learner policy into a fixed one. In more detail, at a particular training iteration of the plurality of training iterations, the system determines whether criteria for converting a particular one of the plurality of learner policies into a fixed policy have been satisfied. For example, the system determines whether a predetermined number (e.g., 50, 100, or 200) of training iterations have been performed since a preceding time that any learner policy has been converted into a fixed one. As another example, the system determines whether an agent controlled by the particular one of the leaner policies has attained a threshold level of performance on the particular task.

In response to a positive determination, the system generates a new fixed policy that is represented by the same parameter values as the particular learner policy. Additionally, in some implementations, the system sets the values of the policy parameters that define the particular learner policy that was used to generate the new fixed policy to new values that are based on the current values for one or more of the other policies in the pool. For example, the system sets the values of the policy parameters to values that define one of the fixed policies.

Additionally, in response to the positive determination, the system can update the reinforcement learning loss function for the particular learning policy by modifying the corresponding hyperparameters of the loss function. The system can further update the matchmaking policy for the particular learning policy by modifying the probability distribution over the pool of candidate action selection policies that is specified by the matchmaking policy.

After adjusting the current values of the policy parameters in this way, the system can determine whether a training termination criterion is met. For example, the system may determine that a training termination criterion is met if the system has performed a predetermined number of training iterations. As another example, the system may determine that a training termination criterion is met if the performance of an agent in completing the particular task controlled using the current policy parameter values of the best performing learner policy satisfies a threshold. In response to determining that a training termination criterion is not met, the system repeats the preceding steps to continue the training.

In response to determining that a training termination criterion is met, the system can provide data specifying the trained policy neural network, e.g., the trained values of the policy parameters and data specifying the architecture of the policy neural network, to another system, e.g., a second reinforcement learning system, for use in controlling a new agent to perform the particular task in a new environment. Instead of or in addition to providing the data specifying the trained network, the system can use the trained policy neural network to process new observations and generate respective action selection outputs.

Advantageously, to employ the most effective strategy that has been discovered during the training, the system selects a final action selection policy for use in controlling an agent in performing the particular task. In other words, the system specifically outputs or uses the trained values of the policy parameters that define the selected final action selection policy, which typically corresponds to the best performing policy. In some implementations, the system can do so by sampling, either with or without replacement, the final action selection policy from a distribution, e.g., a Nash distribution, of the pool of candidate action selection policies.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a policy neural network having a plurality of policy parameters and used to select actions to be performed by an agent to control the agent to perform a particular task while interacting with one or more other agents in an environment, the method comprising:
   maintaining data specifying a pool of candidate action selection policies, the pool of candidate action selection policies comprising:
      (i) a plurality of learner polices for controlling the agent, each learner policy defined by a respective set of values for the policy parameters of the policy neural network, and
      (ii) one or more fixed policies for controlling the agent;
   maintaining, for each of the learner policies, data specifying a respective matchmaking policy for the learner policy that defines a distribution over the pool of candidate action selection policies;
   at a particular training iteration of a plurality of training iterations:
      for each of one or more of the learner policies:
         selecting one or more policies from the pool of candidate action selection policies using the matchmaking policy for the learner policy;
         generating training data for the learner policy by causing a first agent controlled using the learner policy to perform the particular task while interacting with one or more second agents, each second agent controlled by a respective one of the selected policies;
         updating the respective set of values for the policy parameters that define the learner policy by training the learner policy on the training data through reinforcement learning to optimize a reinforcement learning loss function for the learner policy;
         determining that criteria for converting a particular one of the plurality of learner policies into a fixed policy have been satisfied; and
         in response, generating a new fixed policy that is defined by a same set of values for the policy parameters as the particular learner policy.

2. The method of claim 1, wherein the matchmaking policies for two or more of the learner policies are different.

3. The method of claim 2, wherein the learner policies are each assigned a respective type from a plurality of types, wherein each type is associated with a different matchmaking policy from each other type, and wherein each learner policy has the matchmaking policy that is associated with the type to which the learner policy is assigned.

4. The method of claim 1, wherein the matchmaking policy for at least one learner policy is uniform across one or more learner policies that are assigned a particular type and zero for all of the learner policies that are assigned different types and all of the fixed policies.

5. The method of claim 1, wherein the matchmaking policy for at least one learner policy is uniform across all of the learner policies and zero for all of the fixed policies.

6. The method of claim 1, wherein the matchmaking policy for at least one learner policy is uniform across all policies in the pool.

7. The method of claim 1, wherein the reinforcement learning loss function depends on a plurality of hyperparameters, and wherein values for the plurality of hyperparameters are different for two or more of the learner policies.

8. The method of claim 7, wherein the hyperparameters include one or more hyperparameters of a reinforcement learning algorithm used in the training.

9. The method of claim 7, wherein the hyperparameters include one or more internal reward hyperparameters that define whether the reinforcement learning loss function depends on an internal reward and, if so, how the internal reward is computed based on observations received by the agent during performance of the task.

10. The method of claim 1, wherein the one or more fixed policies include a first fixed policy that is defined by values of the policy parameters that have been determined through supervised learning on labeled task instances.

11. The method of claim 10, wherein the supervised learning comprises a first supervised learning using first training data and a second supervised learning using only a selected portion of the first training data that includes only labeled task instances performed by agents that have attained at least a threshold level of performance on the particular task.

12. The method of claim 1, wherein determining that criteria have been satisfied comprises determining that a predetermined number of training iterations have been completed.

13. The method of claim 1, further comprising:
in response to determining that criteria for converting the particular one of the plurality of learner policies into the fixed policy have been satisfied:
setting the set of values for the policy parameters that define the particular learner policy to a new set of values that is determined based on current sets of values for policy parameters that define one or more of the other policies in the pool.

14. The method of claim 13, wherein setting the set of values for the policy parameters that define the particular learner policy to the new set of values that is determined based on the current sets of values for policy parameters that define one or more of the other policies in the pool comprises:
setting the set of values for the policy parameters to a current set of values for policy parameters that define one of the fixed policies.

15. The method of claim 14, further comprising:
in response:
modifying hyperparameters of the reinforcement learning loss function for the particular learner policy.

16. The method of claim 15, further comprising:
in response:
modifying the matchmaking policy for the particular learner policy.

17. The method of claim 1, further comprising, for at least one of the selected policies:
updating the respective set of values for the policy parameters that define the selected policy by training the selected policy on the training data through reinforcement learning to optimize a reinforcement learning loss function for the selected policy.

18. The method of claim 1, wherein determining that criteria have been satisfied comprises determining that the agent controlled by the particular leaner policy has attained a threshold level of performance on the particular task.

19. The method of claim 1, wherein the matchmaking policy for at least one learner policy specifies that the learner policies controlling respective agents that have attained higher levels of performance on the particular task are more likely to be selected than other learner policies controlling the respective agents that have attained lower levels of performance on the particular task.

20. One or more non-transitory computer-readable storage media storing instructions that when executed by one or more computers cause the one or more computers to perform operations for training a policy neural network having a plurality of policy parameters and used to select actions to be performed by an agent to control the agent to perform a particular task while interacting with one or more other agents in an environment, the operations comprising:
maintaining data specifying a pool of candidate action selection policies, the pool of candidate action selection policies comprising:
(i) a plurality of learner polices for controlling the agent, each learner policy defined by a respective set of values for the policy parameters of the policy neural network, and
(ii) one or more fixed policies for controlling the agent;
maintaining, for each of the learner policies, data specifying a respective matchmaking policy for the learner policy that defines a distribution over the pool of candidate action selection policies;
at a particular training iteration of a plurality of training iterations:
for each of one or more of the learner policies:
selecting one or more policies from the pool of candidate action selection policies using the matchmaking policy for the learner policy;
generating training data for the learner policy by causing a first agent controlled using the learner policy to perform the particular task while interacting with one or more second agents, each second agent controlled by a respective one of the selected policies;
updating the respective set of values for the policy parameters that define the learner policy by training the learner policy on the training data through reinforcement learning to optimize a reinforcement learning loss function for the learner policy;
determining that criteria for converting a particular one of the plurality of learner policies into a fixed policy have been satisfied; and
in response, generating a new fixed policy that is defined by a same set of values for the policy parameters as the particular learner policy.

21. A system comprising one or more computers and one or more storage devices storing instructions that when executed by one or more computers cause the one or more computers to perform operations for training a policy neural network having a plurality of policy parameters and used to select actions to be performed by an agent to control the agent to perform a particular task while interacting with one or more other agents in an environment, the operations comprising:

maintaining data specifying a pool of candidate action selection policies, the pool of candidate action selection policies comprising:
- (i) a plurality of learner polices for controlling the agent, each learner policy defined by a respective set of values for the policy parameters of the policy neural network, and
- (ii) one or more fixed policies for controlling the agent;

maintaining, for each of the learner policies, data specifying a respective matchmaking policy for the learner policy that defines a distribution over the pool of candidate action selection policies;

at a particular training iteration of a plurality of training iterations:
for each of one or more of the learner policies:
selecting one or more policies from the pool of candidate action selection policies using the matchmaking policy for the learner policy;
generating training data for the learner policy by causing a first agent controlled using the learner policy to perform the particular task while interacting with one or more second agents, each second agent controlled by a respective one of the selected policies;
updating the respective set of values for the policy parameters that define the learner policy by training the learner policy on the training data through reinforcement learning to optimize a reinforcement learning loss function for the learner policy;
determining that criteria for converting a particular one of the plurality of learner policies into a fixed policy have been satisfied; and
in response, generating a new fixed policy that is defined by a same set of values for the policy parameters as the particular learner policy.

22. The system of claim 21, wherein the matchmaking policies for two or more of the learner policies are different.

23. The system of claim 22, wherein the learner policies are each assigned a respective type from a plurality of types, wherein each type is associated with a different matchmaking policy from each other type, and wherein each learner policy has the matchmaking policy that is associated with the type to which the learner policy is assigned.

24. The system of claim 21, wherein the matchmaking policy for at least one learner policy is uniform across one or more learner policies that are assigned a particular type and zero for all of the learner policies that are assigned different types and all of the fixed policies.

25. The system of claim 21, wherein the matchmaking policy for at least one learner policy is uniform across all of the learner policies and zero for all of the fixed policies.

26. The system of claim 21, wherein the matchmaking policy for at least one learner policy is uniform across all policies in the pool.

27. The system of claim 21, wherein the reinforcement learning loss function depends on a plurality of hyperparameters, and wherein values for the plurality of hyperparameters are different for two or more of the learner policies.

28. The system of claim 27, wherein the hyperparameters include one or more hyperparameters of a reinforcement learning algorithm used in the training.

29. The system of claim 27, wherein the hyperparameters include one or more internal reward hyperparameters that define whether the reinforcement learning loss function depends on an internal reward and, if so, how the internal reward is computed based on observations received by the agent during performance of the task.

30. The system of claim 21, wherein the operations further comprise:
in response to determining that criteria for converting the particular one of the plurality of learner policies into the fixed policy have been satisfied:
setting the set of values for the policy parameters that define the particular learner policy to a new set of values that is determined based on current sets of values for policy parameters that define one or more of the other policies in the pool.

* * * * *